US005628230A

United States Patent [19]
Flam

[11] Patent Number: 5,628,230
[45] Date of Patent: May 13, 1997

[54] METHOD AND APPARATUS FOR TESTING THE EFFICACY OF PATIENT SUPPORT SYSTEMS

[76] Inventor: Eric Flam, 29 Ainsworth Ave., East Brunswick, N.J. 08816

[21] Appl. No.: 332,663

[22] Filed: Nov. 1, 1994

[51] Int. Cl.⁶ .................................................. G02M 19/00
[52] U.S. Cl. ........................................... 73/172; 73/866.4
[58] Field of Search ................................ 73/172, 379.01, 73/866.4; 128/774, 781, 779

[56] References Cited

U.S. PATENT DOCUMENTS

| | | | |
|---|---|---|---|
| 2,378,039 | 6/1945 | Schenker | 73/172 |
| 3,147,617 | 9/1964 | Kaptur, Jr. et al. | 73/172 |
| 3,413,849 | 12/1968 | Janapol | 73/172 |
| 3,513,698 | 5/1970 | Ross | 73/172 |
| 3,841,163 | 10/1974 | Daniel | 73/172 X |
| 3,962,801 | 6/1976 | Gonzalez | 35/17 |
| 4,349,339 | 9/1982 | Daniel | 73/866.4 X |
| 4,409,835 | 10/1983 | Daniel et al. | 73/866.4 |
| 4,438,650 | 3/1984 | Meek | 73/866.4 X |
| 4,669,302 | 6/1987 | Wagner et al. | 73/172 |
| 4,836,215 | 6/1989 | Lee | 128/774 X |
| 4,858,620 | 8/1989 | Sugarman et al. | 128/774 |
| 5,042,504 | 8/1991 | Huberti | 128/779 |
| 5,148,706 | 9/1992 | Masuda et al. | 128/774 X |
| 5,253,656 | 10/1993 | Rincoe et al. | 73/172 X |
| 5,357,804 | 10/1994 | Wesemann et al. | 73/172 X |
| 5,408,754 | 4/1995 | Raab | 127/774 X |

Primary Examiner—Elizabeth L. Dougherty
Attorney, Agent, or Firm—Henry I. Schanzer, Esq.

[57] ABSTRACT

An anthropomorphic model for ascertaining the presence of certain forces within flexible human skin material covering the model. The anthropomorphic model can simulate the major dynamic characteristics of a human. The anthropomorphic model is adaptably representative of specific classes of human body form as regards body build and including flexible human skin simulating materials including a cutaneous region and a subcutaneous region covering at least parts of the model. The anthropomorphic model includes sensing means located within the flexible human skin simulating materials for measuring physical parameters such as pressure, shear and friction forces acting on the anthropomorphic model and means for detecting signals from the sensing means for ascertaining at least one of the pressure, shear and friction forces existing within the flexible skin simulating materials. The anthropomorphic model may be used to test the efficacy of support structures in the prevention and treatment of decubitus or pressure ulcers and related conditions.

36 Claims, 5 Drawing Sheets

METHOD AND APPARATUS FOR TESTING THE EFFICACY OF PATIENT SUPPORT SYSTEMS

This invention was made with government support under NIH Grant No. 2R44HD32143-02 from the National Institute of Child Health and Human Development, Small Business Innovation Research Program. The government has certain rights in this invention.

BACKGROUND OF THE INVENTION

A decubitus ulcer, or pressure ulcer as it is more commonly known, is a localized wound of variable depth caused by prolonged pressure in a patient allowed to lie too still in bed over an extended period of time. Sustained compression of the cutaneous and subcutaneous tissue between the bony prominences of the patient's body and the support structure, e.g. the mattress, has been cited as a primary cause of pressure ulcer formation. Thus, the sites most often affected in bed-ridden patients include the sacrum, greater trochanter, heel and scapula—these are the sites which usually experience higher pressures or loads due to body weight distribution.

From the treatment of patients in acute care facilities to their care in the home setting, the incidence of pressure ulcer development, and the degeneration of tissues associated with such ulcers, once formed, present a significant health care problem both in terms of the amount of financial resources expended in treatment and, more importantly, in the morbidity and mortality associated with the complications which often arise. Depending on the severity of the pressure ulcer and the medical condition of the patient, it has been estimated that the cost of treatment can be as high as $40,000 (Brandeis et.al., JAMA 264:2905-2908 (1990)). In one study it was reported that the rate of occurrence of bacteremia associated with pressure ulcers was 3.5 events per 10,000 hospital discharges. The hospital mortality rate from this complication alone was estimated to be 50% (Allman, Decubitis 2:30-33 (1989)).

Although current understanding of pressure ulcer etiology is incomplete, it is known that the development of such ulcers is the result of a myriad of factors which often interact with one another in a complex manner. It has been recognized that purely conservative measures can be used to control one or more of these factors and that these measures alone can result in the prevention of pressure ulcer development and in more effective treatment of those which have developed. One conservative measure which has been identified to be of critical importance in this regard, is the choice of effective support surfaces, such as wheelchair cushions as well as other seating devices and, more importantly, mattresses, which are utilized in the day-to-day patient care. In the following discussion, the general term "support structure" will encompass such varied products as beds, mattresses, cushions, mattress overlays and covers, and sheets, in addition to operating room tables and other types transitional structures i.e, all types of products with which a patient might have contact.

All of the products mentioned above impinge upon defined areas of a patient's body and so present their own unique set of problems and concerns for healthcare workers and researchers in the field of pressure ulcer prevention. For example, the areas at risk of pressure ulcer development as a result of inadequately designed seating devices center primarily around the ischium but can involve the posterior regions of the knee joints and lower thigh. More generalized areas are at risk of pressure ulcer development however, when the design of operating room tables and other transitional structures is examined.

FACTORS TO BE CONSIDERED IN THE DESIGN OF A SUPPORT STRUCTURE

There is no universal support surface which can be effectively used with every patient who might be at risk of developing a pressure ulcer. Indeed, the criteria for developing any type of support structure transcend the purely practical constraints of economy, durability and ease of use. The factors which prevent the design of the universal support structure are those associated with the individual patient such as diagnosis; tissue history (previous incidence of tissue breakdown, surgical repair or stress); and body build (percentage of body fat and its distribution or localization). In the design of any type of support structure for the prevention, or treatment, of pressure ulcers, the interaction between these and other patient-related variables together with the three mechanical forces of pressure, shear and friction, all of which have been implicated in the cause or exacerbation of pressure ulcers, is of great importance. A review of the three mechanical forces and their interaction with the support structure, as well as a discussion of the means used to measure them, is informative at this juncture.

(1) Contact Pressure

Contact pressure is that force exerted on the cutaneous and subcutaneous tissues by the patient's body weight and bony prominences on one side and the support structure on the other. The incorporation of material into a support structure which has the ability to reduce, redistribute or modify the pressure forces generated by a patient's body weight and bony prominences is of obvious importance in the design of an effective support structure for the prevention or treatment of pressure ulcers.

At present there are a number of devices which are routinely utilized by designers of support structures to measure the ability of their products to reduce contact pressure. These devices range from simple pneumatic types to the more complex, which utilize electro-pneumatic and electro-resistive means. Such devices may employ algorithms to sense pressure change. The pressure change, so detected, is translated by the device and displayed in a standardized form. Some measuring devices use fluids instead of air to sense changes in pressure.

Pneumatic and electro-pneumatic measuring devices consist essentially of a pressure-reading instrument connected to a probe. The probe consists of an inflatable bladder in the pneumatic devices or, in the electro-pneumatic devices, an inflatable bladder containing a wire grid on each of its two opposing walls (electrical connection is broken when the grids are separated). The uninflated pneumatic-type probes are placed beneath the body site to be measured and air is supplied until, in the electro-pneumatic devices, the two grids are separated or, in the pneumatic devices, until internal pressure is equal to external loading pressure. The contact pressure is calculated as that pressure which corresponds to the pressure between the body site and the underlying support structure as measured by the attached pressure-reading instrument. Electro-resistive devices for measuring contact pressure consist of a probe containing sensors composed of materials whose electrical resistance properties vary with the pressure which is applied to their surface. Such electro-resistive devices for measuring contact pressure can contain single-, or multiple-sensor-probes. Strain gages or strain gage assemblies are usually included as component parts of such pressure measuring instruments. Just as in the pneumatic-type devices, the change in resistance of the sensor(s) is measured by appropriate instrumentation and, by virtue of calibration methods, the contact pressure between the body site and underlying support structure can be estimated from the change in resistance as recorded on the attached instrumentation.

(2) Shear Shear is defined as a mechanical stress which is applied parallel to a plane of interest. Shear is proportional to the pressure at any given site. Like pressure, it exerts a degree of trauma on cutaneous and subcutaneous tissues, thereby compromising circulation and, as such, it is likely to be an important factor in so-called "pressure ulcer" formation. The majority of support structures are contained in an external covering material to protect the interior from patient discharges. The external covering material can produce shear stress and one manifestation of such shear stress is the so-called "hammock effect." The hammock effect occurs when the support structure external covering material supports the bulk of the patient's body weight in a manner which is independent of the interior of the support structure. In this situation, the external covering material has a tendency to cause relative movement of the cutaneous and subcutaneous tissues along the sides of the contact area between the external covering material and the patient's body. Shear forces and stress are also generated when the head region of a patient's hospital-type bed is raised relative to the lower portions resulting in slippage of the patient's lower body regions.

Although clinical literature discusses the significance of shear forces in the development and progression of pressure ulcers in bed-ridden patients, it does not define specific means for measuring the shear forces which cause the observed clinical effects. Indeed, to date, no procedures have been described which will accurately measure the total shear forces experienced by various sites on a patient's body. Nor are there any means presently available which are capable of determining how much of what is presently recorded as a "pressure" effect is, in actual fact, a shear effect.

As stated previously, strain gages are often used as the primary means of detection in devices which are used to measure different types of force. The principle upon which the operation of the strain gage is based is, in essence, a simple one: the load placed on the gage or housing which contains the gage produces a force; the force causes the gage to strain or stretch in response to its application; the force alters the physical properties of the gage such that there is a change in its electrical properties such as resistance; this resistance change can be detected and converted into an accurate measurement of force.

For the above reasons, strain gages are particularly suited for use in instrumentation for the direct measurement of shear forces. The tendency of tissue to deform due to shear can be detected by the change in such properties as electrical resistance in the attached gage. In this regard, the Y series of encapsulated foil strain gages and G series of foil strain gage manufactured by Omega Engineering, Inc. of Stamford, Conn.; and the semiconductor strain gages such as types C, D, E, F, G, H, and L supplied by Kulite Semiconductor Products, Inc. of Leonia, N.J. are useful.

(3) Friction

Friction is defined as the force generated between two surfaces as they move across one another. As such, it is a factor which is considered to be of some importance in not only the formation of pressure ulcers, but also in the progressive deterioration of tissues which occurs as a result of their development. When, for example, the external covering of the support structure, described earlier, moves relative to the skin of a patient, frictional forces are generated. When such frictional forces are exerted on the patient's skin, the skin is exposed to frictional drag which causes abrasion of its outermost layers.

When examining the forces of friction, two factors must be considered—the actual force with which the patient's body is pushing against the external covering material and the relative smoothness, softness or lubricity of the external covering material which contacts the skin.

The coefficient of friction is the product of such support structure properties as external covering material smoothness, softness and lubricity and the clinical characteristics of the opposing external skin. Current methods for measuring friction usually involve dragging a weighted sled, with the material of interest on its contact side, across the surface of the skin.

Frictional drag produces a strain on tissue and so an alternative means of measuring its magnitude would be by the use of localized force indicators such as strain gages.

CONCLUSION

From the foregoing discussion of the importance of contact pressure, shear and friction in "pressure ulcer" development and progression, as well as that regarding the methods available for their measurement, it is apparent that, at the present time, a support structure's ability to reduce the incidence and severity of pressure ulcers cannot be accurately determined prior to it being marketed. The current pre-marketing test procedures used to determine contact pressure, shear and friction are inadequate or nonexistent— there are no universally accepted means of, or procedures for, measuring contact pressure in this context. Reproducibility of results from both within and between testing centers is impractical; the various pressure measuring devices, discussed earlier, produce different readings under the same test conditions. Likewise, the determination of frictional drag, mentioned above, is not universally applicable. In addition, there are no methods currently available to measure shear in this context.

As a result of the current inadequacies in pre-market testing, patients are exposed to an unknown risk of developing "pressure" ulcers while being treated in healthcare facilities and precious healthcare resources are being potentially wasted on equipment with no measure of efficacy in the area of pressure ulcer prevention or amelioration.

TOWARDS A UNIVERSAL TESTING SCHEME

As discussed previously, the choice of a suitable support structure for the patient at risk of developing so-called "pressure ulcers" is vital in the prevention of this serious and potentially life-threatening condition. As an initial preventative measure, it not only is the most effective means of controlling the problem, but also the most economical. Unfortunately, there are no universally accepted means currently available to test the various types of commercially available support structures before they are introduced into hospitals and other healthcare institutions. Moreover, the majority of testing procedures which are presently utilized, only take into account the contribution of contact pressure in the development of pressure ulcers and so, in light of the foregoing discussion, are deficient.

Most initial evaluations of support structures are performed using individual volunteer subjects of varying physical characteristics of weight, height, anatomical frame, gender and age. The results of such evaluations cannot be duplicated or extrapolated to different physiognomies. Furthermore, such evaluations are performed merely to provide the documentation required to introduce the support structures into the healthcare facility.

In reality, at the present time, the true efficacy parameters of the product can only be determined from its actual performance once in-use in the facility. Not only are such means of assessing efficacy undesirable, exposing, as they do, patients to an unknown risk of developing pressure ulcers, but they also provide a potentially meaningless assessment. Even in well-designed, randomized clinical trials, great care must be exercised to ensure strict adherance to the study protocol. Such studies are usually conducted over extended periods of months or even years and involve a large expenditure of financial resources. Failure to comply with the study protocol can result in invalidation of the results and so negate the value of the study for use in justifying clinical outcomes.

Pressure sore development, as discussed previously, occurs as a result of the interaction of a variety of factors. The presence of these various factors, or their interaction, cannot be assessed in the scientifically uncontrolled environment of the healthcare facility.

As a result of the inability of current methodologies and procedures to accurately assess the efficacy of support structures used in the prevention and treatment of pressure ulcers, valuable healthcare resources are being drained from an already overburdened system. Resources are being wasted not only in the purchase of products whose efficacy is largely unknown, but also in the treatment of pressure ulcers which develop as a result of exposing patients to products which are not efficacious.

A preferred methodology for testing support structures to determine their ability to prevent pressure ulcer formation would be one which is both uncomplicated in its utilization and universal in nature i.e., one which would give reproducible results no matter where in the world testing was conducted. In addition, given the earlier discussion of the present inability to accurately measure the three mechanical forces which have been cited as being of importance in pressure ulcer formation, such testing methodology would also include, at a minimum, some means of accurately measuring contact pressure, shear and friction.

The present invention contemplates provision of a standardized testing system and method for evaluation of the efficacy of support structure products in the prevention and treatment of pressure ulcers. The manner in which this has been achieved is by the incorporation of sensors of contact pressure, shear and friction into the design of an anthropomorphic model which is representative of the human body in respect to such features as anatomical contours; height, weight and weight distribution; and compliance, flexibility and tissue thickness.

As a result of the flexible and adaptable nature of its design, the present invention can also be adapted to include an assessment of other factors which might be considered important in the development of pressure ulcers. The effect of these factors on pressure ulcer development can be assessed alone or in conjunction with other variables such as those of contact pressure, shear and friction already mentioned. Examples of such other factors are temperature and moisture accumulation within the skin due to sweating, normal moisture loss from the body and moisture accumulation due to uncontrolled factors such as incontinence. In this regard, the physical properties of the material or materials used to simulate human skin and subcutaneous tissues in the anthropomorphic model combined with the ability to incorporate means of simulating normal moisture loss and sweating within the model e.g. fluid reservoirs and heating filaments, would enable clinical investigators or researchers to examine and monitor the role of these factors in the formation and progression of pressure ulcers.

In the past, anthropomorphic devices have found extensive use in studies of various aspects of motor vehicle safety and, in a related context, as parts of model systems designed to assess the effects of motor vehicle accidents on the vehicle occupants. As such, the idea of placing sensors of various types on the surface of, and within, the anthropomorphic device, is not of itself new. However, one novel aspect of the present invention, and one which distinguishes it from the anthropomorphic systems proposed to date, is its placement of particular sensing means at various experimentally-predetermined positions of physiological importance to the development and clinical progression of pressure ulcers. The placement of the sensing means is of such sensitive nature that their output as regards contact pressure, shear and friction can be correlated to the actual forces acting on the cutaneous and subcutaneous tissues in vivo. In this way, the anthropomorphic model of the present invention can be used to accurately assess, in a standardized manner, the external factors which will predispose an individual to pressure ulcer formation and their pathological progression.

This ability to accurately assess the role of external factors in pressure ulcer development and pathological progression imparted by the anthropomorphic model of the present invention is especially valuable when it is remembered that many pressure ulcers are initiated beneath the surface of the skin, usually in the deeper tissue regions. By the time these pressure ulcers are visible on the surface of the skin, they have usually already severely undermined large areas of tissue between the bone and skin surface, often forming channels, sinus tracts and large areas of dead or missing tissue. An understanding of the way in which external factors translate into internal forces beneath the surface of the skin is critical to not only the assessment of the efficacy of new support structures, but also to an understanding of the pathology of pressure ulcer development and progression.

In addition, the positioning of the various sensors within the anthropomorphic model combined with the ability to manufacture the model to a variety of specifications which are representative of the varied forms of the human body allows the contribution of the various forces to be accurately assessed for an infinite variety of body types. The system is thus capable of separating the various forces in a manner which has not been possible up until the present time. Such an ability is an invaluable component of not only a testing system, but also any system designed to investigate the individual and combined effect of such variables as contact pressure, shear, friction, moisture accumulation and temperature in pressure ulcer development and progression.

The design of the anthropomorphic model system also lends itself to testing and study programs involving actual human tissue. Sections of human tissue may be introduced into the compartmentalized structure of the anthropomorphic model and tissue viability assessed over time relative to the application of various support structures. The viability of the sections of human tissue will be proportional to the forces acting upon them and so indicative of the efficacy of the support structure being tested.

SUMMARY OF THE INVENTION

The present invention achieves its objectives in a simple, straightforward yet elegant manner. The anthropomorphic model is of stable construction and composed of durable materials so that it will retain over an extended period of time, its characteristics of human-like contour; weight and weight distribution; tissue compliance, flexibility and thickness. Its specifications can be so rigidly delineated that it is capable of being manufactured in a reproducible manner in different shapes, sizes and weights which are representative of various classes of male and female body types.

The sensor means capable of measuring contact pressure and shear are placed at discrete, predetermined locations on the surface of the anthropomorphic model and at experimentally predetermined depths of physiological importance within the portions of the model which correspond to the inner tissues. Sensor means capable of measuring friction are also located on or near the surface of the model at experimentally predetermined positions of physiological importance. Although, the location of the sensor means correspond to those areas of a patient's body where pressure ulcers are known to develop, the flexibility of the testing system is such that sensor means may also be easily located at positions which normally experience lower loadings. This permits the actual measurement of forces at an almost infinite variety of sites both before and after the anthropomorphic model has been placed on a support structure. Placement of sensor means at discrete positions on the surface of the anthropomorphic model as well as at predetermined positions of clinical importance within the model enable the three forces of contact pressure, shear and friction to be measured in as close to the real life situation as is possible.

The sensor means are placed so that they are easily accessible and so can be removed to check accuracy or replaced when no longer functional by relatively unskilled individuals. The output of each sensor is measured, processed and recorded by suitable instrumentation equipped with programs to collate the data in a form that can be easily interpreted. If desirable, the means for transmitting the data obtained from the sensing means can be located entirely within the model, thereby obviating the need for the attachment of any external means for signal transduction.

It is therefore an object of the present invention to provide an anthropomorphic model which embodies a standardized testing system which produces quantifiable measurements of contact pressure, shear and friction for the evaluation of the efficacy of support structures designed to prevent pressure ulcers or reduce the trauma associated with existing pressure ulcers, so that manufacturers and healthcare facilities alike can determine the efficacy of support structures in a reproducible manner for all types of patient.

It is a further object of this invention to provide an anthropomorphic model which will enable clinical investigators and researchers to delineate the role of, and assess the efficacy of support structures in decreasing the effect of other factors e.g. temperature and moisture accumulation, which have been implicated in pressure ulcer development and progression.

It is a further object of this invention to provide an anthropomorphic model which simulates the various forms of the human body in such a manner that quantitative measurements of contact pressure, shear and friction can be obtained at predetermined positions corresponding to areas of the human body at risk of pressure ulcer development in order to facilitate research into the relationship of these three mechanical forces to the development of pressure ulcers.

It is another object of the present invention to provide an anthropomorphic model from which quantifiable measurements of contact pressure, shear and friction can be obtained under conditions which mimic those which would be experienced by a hospitalized patient such that various clinical parameters of importance to the choice and useful life of support structures can be measured in the controlled environment of the laboratory.

DESCRIPTION OF THE PREFERRED EMBODIMENT

Figure 1:
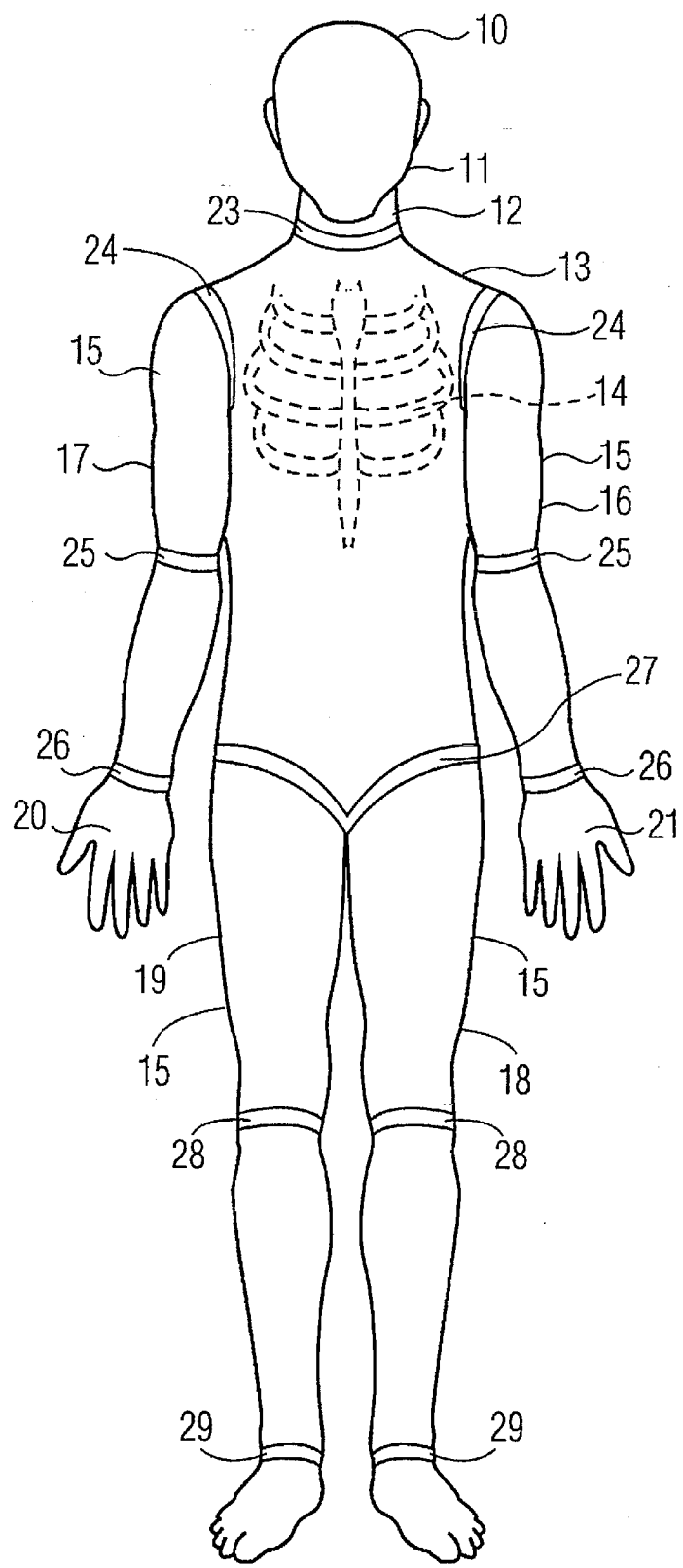
FIG. 1 is a front elevational view of the anthropomorphic model of this invention.
Figure 2:
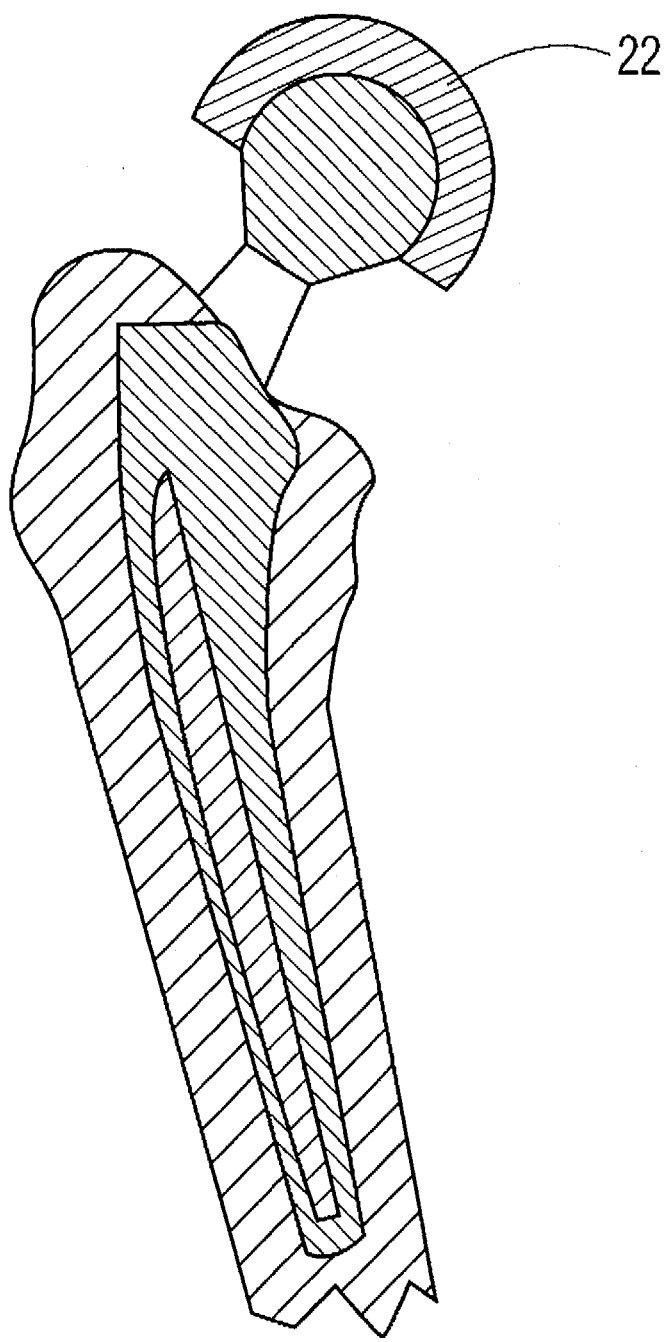
FIG. 2 is a side elevational view of a typical joint in the limbs.
Figure 3:
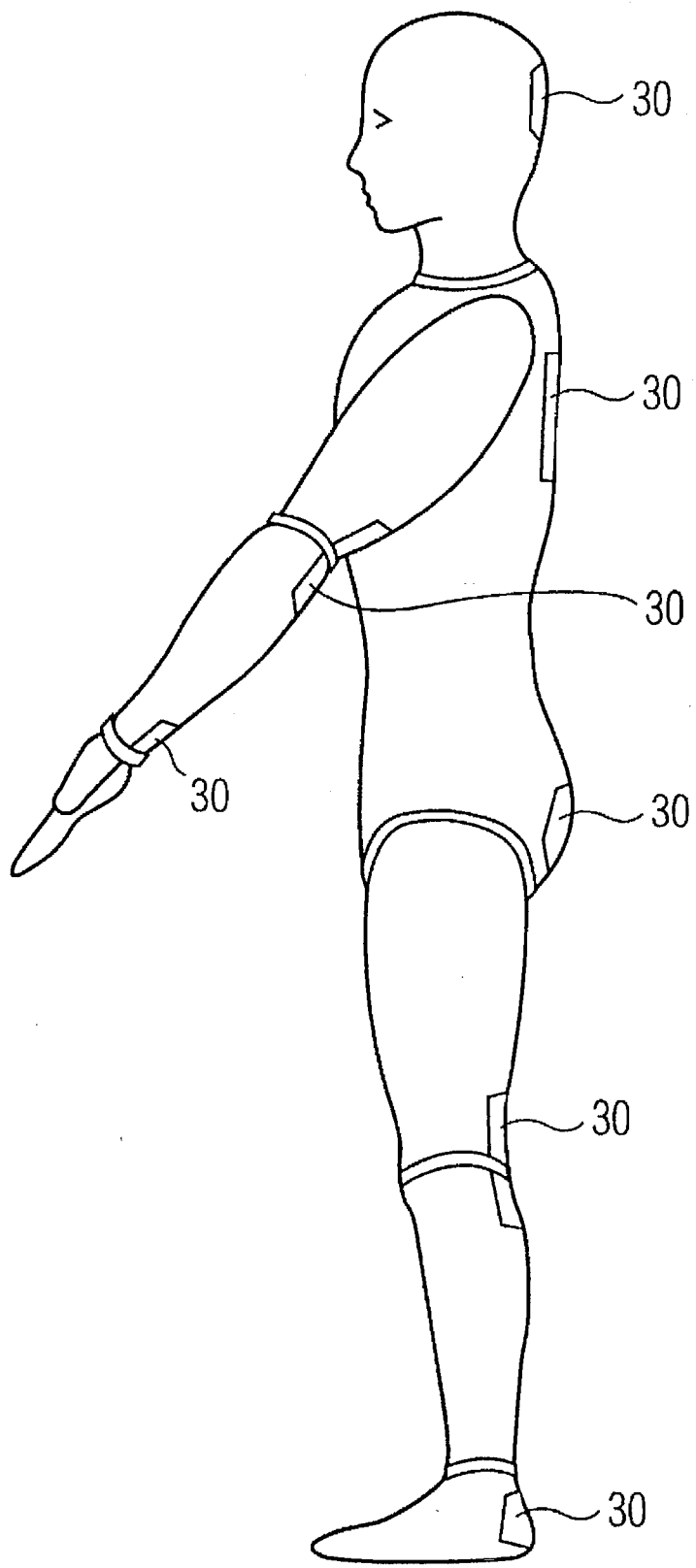
FIG. 3 is a side elevational view of the anthropomorphic model of FIG. 1.
Figure 4:
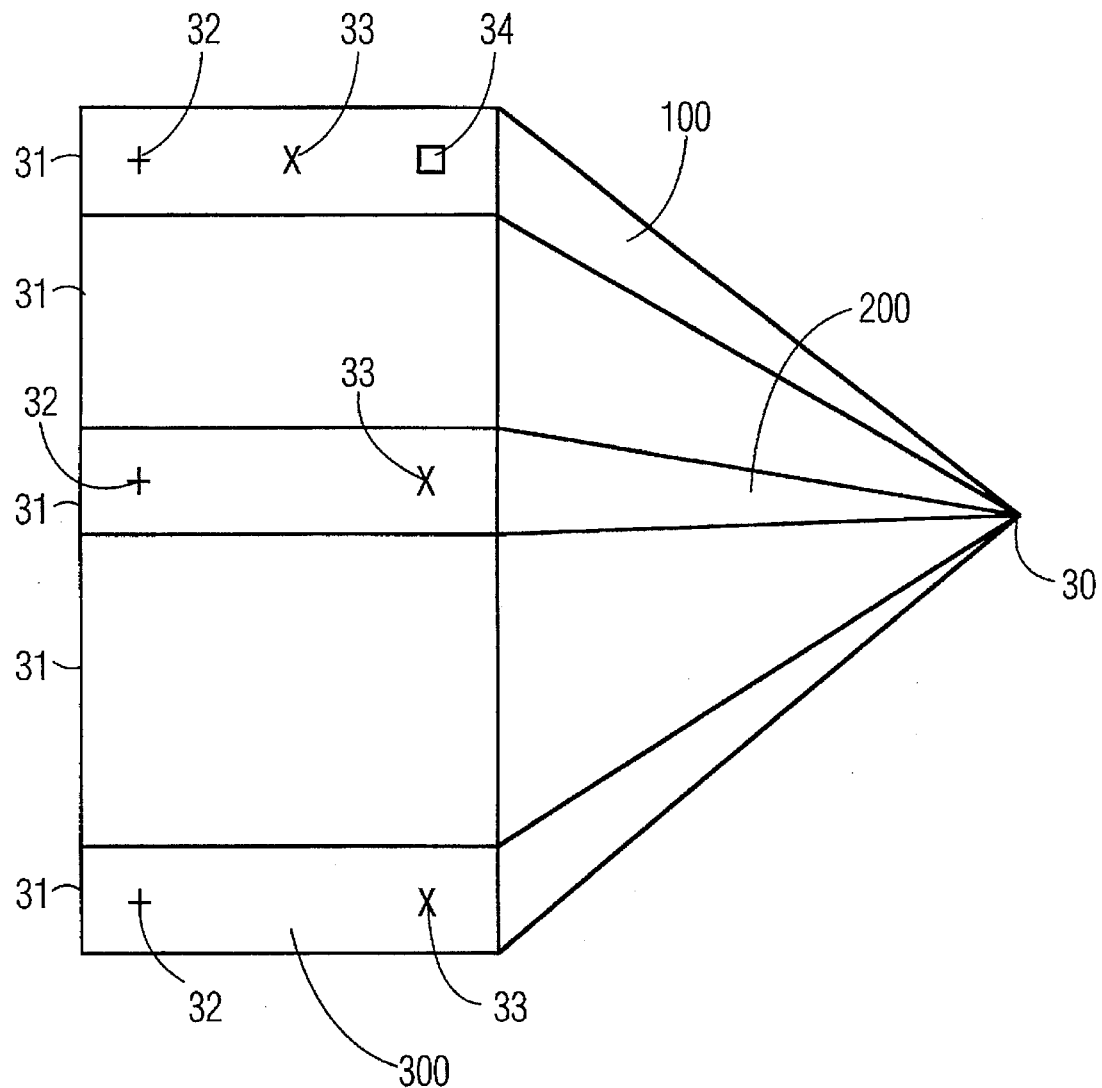
FIG. 4 is an expanded schematic model of the placement of sensors for detecting contact pressure, shear and friction forces in the human skin and subcutaneous layers simulating material.
Figure 5A:
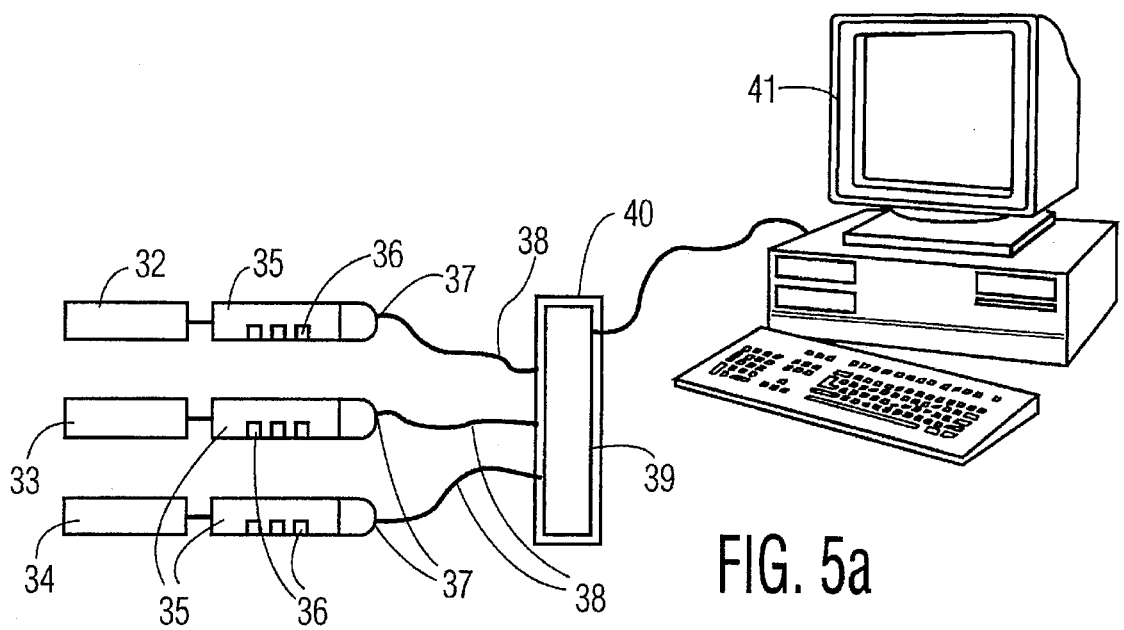
FIG. 5(a) is a schematic representation of an arrangement of sensors for detecting contact pressure, shear and friction forces; the data receiving module, composed of signal processing circuits and a signal transmitting terminus assembly; data storage and retrieval modules; and computer processing assembly.
Figure 5B:
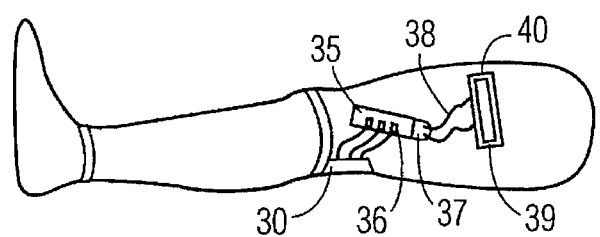
FIG. 5(b) is a schematic representation of one embodiment of
the signal detection, transmitting and processing pathway depicted in FIG. 5(a) within a limb of the anthropomorphic model.
Figure 5C:
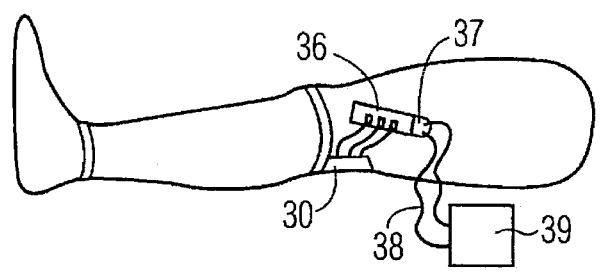
FIG. 5(c) is a schematic representation of an alternative embodiment of the signal detection, transmitting and processing pathway depicted in FIG. 5(a) within a limb of the anthropomorphic model. In this embodiment, the data receiving module is attached by signal transmitting wires to the data storage and retrieval module which is located at a position outside the anthropomorphic model.

A preferred embodiment of the invention incorporates a number of features. The specific form of those features presented in the preferred embodiment of the invention is in accordance with its use as a model system for testing various support structures for their ability to prevent the formation of pressure ulcers. This application has been selected because of its importance. In other applications, other specific forms may be preferable.

Reference will now be made to the drawings, whereby like parts are designated by like numerals. The anthropomorphic model 10 includes head means 11, neck means 12, and body means 13 which includes chest/rib defining means 14. Limb means 15 include a pair of arms 16, 17, a pair of legs 18, 19, and a pair of hands 20, 21. Joint means 22 provide low friction or frictionless articulated connections at a neck joint 23, shoulder joints 24, elbow joints 25, wrist joints 26, hip joints 27, knee joints 28, and ankle joints 29. Incorporation of the joint means 22 into the design and structure of the anthropomorphic model 10 enables the anthropomorphic model 10 to be manipulated into a variety of positions which have a direct relationship to the human form and to changes in loading which result from changes in relative positions of various body parts. The anthropomorphic model 10 can be manufactured in a variety of size and weight classes so that representatives of each class of human body size and shape can be made available for testing. A given model 10 may also be provided with means (not shown), internal to the model, for attaching discrete concentrated weights, for example in the vicinity of the shoulder blades, buttocks, hips, heels, etc. to simulate various weight classes using single models.

Detachable portions 30 of the anthropomorphic model 10 of this embodiment are composed of layers 100, 200, 300 of a flexible material 31 simulating human skin and subcutaneous tissue. The flexible material 31 simulating human skin and subcutaneous tissue may be uni- or multi-layer depending upon the precise application and testing procedures employed.

The layers of flexible skin and subcutaneous tissue simulating material 31 which make up the detachable portions 30 of the anthropomorphic model 10 are especially adapted to support or contain various types of sensing means 32, 33, 34. Mounted on the outer surface 100 of the skin and subcutaneous tissue simulating material 31 are contact pressure sensing means 32, shear force sensing means 33 and friction sensing means 34. The middle layer 200 of skin and subcutaneous tissue simulating material 31 contains contact pressure sensing means 32 and shear force sensing means 33. The innermost layer 300 of skin and subcutaneous tissue simulating material 31 contains contact pressure sensing means 32 and shear force sensing means 33. Sensing means 32, 33, 34 are incorporated into the anthropomorphic model 10 in such a way as to facilitate ease of detachment and replacement even by those unskilled in the art.

Each sensing means 32, 33, 34 is of modular design and construction and is coupled to or is integral with a data receiving module 35 composed of a signal processing circuit 36 and a signal transmitting terminus assembly 37, the latter being connected by a plurality of leads 38 or a data bus to data storage and retrieval modules 39 located in predetermined parts of the anthropomorphic model 10 which do not interfere with the ability of the system to take the necessary measurements. The data storage and retrieval modules 39 are each enclosed in a cushioned and rugged protective housing 40. The data storage modules 39 receive and store the output signals from the various sensors and transmit them to a computer terminal 41. The computer 41 is programmed to read the data supplied by each sensing means 32, 33, 34, in a conventional manner. Appropriate algorithms for performing mathematical summing, averaging, statistical analysis or other operations on the data generated by the various sensors to be collated and displayed may be conducted in a manner known to one of ordinary skill in the art.

In an alternative embodiment of the invention, each sensing means 32, 33, 34 is of modular design and construction and consists of a data receiving module 35 composed of a variety of signal processing circuits 36 and a signal transmitting terminus assembly 37 which is connected by a plurality of leads 38 to data storage and retrieval modules 39 located at a position external to the anthropomorphic model 10.

Commonly available "off-the-shelf" items can be used to sense and record contact pressure, shear and friction. For example, suitable devices for sensing shear forces are the RY21, RY61 and Y series of strain gages manufactured by Omega Engineering, Inc. of Stamford, Conn.; suitable devices for measuring contact pressure are those in the 170 series manufactured by Omega Engineering, Inc.; and suitable devices for measuring friction are also strain gages manufactured by Omega Engineering, Inc.

In addition, commonly available components can be utilized to measure other variables, quantificatation of which might be considered desireable. For example, temperature measuring instruments such as thermistors and thermocouples of suitable dimensions for placement within the anthropomorphic model are available from Cole-Parmer of Niles, Ill. Also, devices for measuring skin moisture such as the Dermal Phase Meter are manufactured by Nova Technology Corporation of Gloucester, Mass.

What is claimed is:

1. An anthropomorphic model system comprising:

an anthropomorphic model simulating the major dynamic characteristics of a human, said anthropomorphic model being adaptably representative of specific classes of human body form as regards body build and including flexible human skin and subcutaneous tissue simulating materials comprising a cutaneous region and a subcutaneous region covering at least parts of the model;

sensing means located at predetermined positions on, and in the vicinity of, the surface of the skin defining the cutaneous region and within the subcutaneous region, within the interior of said anthropomorphic model, said sensing means for measuring physical parameters acting on said anthropomorphic model when arranged in life-like positions resting on a support structure, such physical parameters including pressure, shear and friction forces; and means for detecting and displaying signals from said sensing means whereby decreased or increased signals from said sensing means are indicative of the forces existing at and within the cutaneous and subcutaneous regions.

2. The anthropomorphic model system of claim 1 wherein said anthropomorphic model comprises at least one of:

head means;

neck means;

body means which include chest and rib defining means;

limb means which include arm, leg and hand means;

a plurality of joint means providing articulated connection means at least at one of neck, shoulder, elbow, wrist, hip, knee and ankle means;

detachable means composed of said flexible human skin simulating materials, said flexible human skin and subcutaneous tissue simulating materials being layered, said detachable means containing force sensing means situated on the surface of said human skin and subcutaneous tissue simulating materials and at varying depths within;

sensing means comprising data receiving means and signal transmitting means; and data storage and retrieval means.

3. The anthropomorphic model of claim 1 wherein said sensing means comprises a strain gage.

4. The anthropomorphic model of claim 1 wherein said flexible human skin simulating materials simulate human skin and subcutaneous tissues as to at least one of the properties of: compliance, elasticity; porosity; surface friction; and thickness.

5. The anthropomorphic model of claim 2 wherein said flexible human skin simulating materials simulate the human skin and subcutaneous tissues as to at least one of the properties of: compliance, elasticity; porosity; surface friction; and thickness; said human skin and subcutaneous tissue simulating materials being disposed at least on areas of said anthropomorphic model which correspond to said detachable means containing said sensing means.

6. The anthropomorphic model system of claim 2 wherein said detachable means containing said sensing means are removable and said sensing means are replaceable.

7. The anthropomorphic model system of claim 2 wherein said detachable means are interchangeable between different types of anthropomorphic models which are representative of different forms of human body.

8. The anthropomorphic model system of claim 2 wherein said detachable means are specific to anthropomorphic models which are representative of a specific form of human body.

9. The anthropomorphic model system of claim 1 wherein said sensing means includes a plurality of sensors which are incorporated with at least one of: the outer surface of said human skin and subcutaneous tissue simulating material situated on the surface of said detachable means, said sensing means capable of measuring at least one of temperature, moisture accumulation, pressure, shear or friction;

the middle layer of said human skin and subcutaneous tissue simulating material, said sensing means capable of measuring at least one of temperature, moisture accumulation, pressure and shear;

the innermost layer of said human skin and subcutaneous tissue simulating material, said sensing means capable of measuring at least one of temperature, moisture accumulation, pressure or shear.

10. The anthropomorphic model system of claim 1 wherein said anthropomorphic model contains:

sensing means capable of signal transduction in response to activation of said sensing means by the generation of force or other physical phenomena;

data transmitting means for transmitting said signal to data receiving and storage means, said transmitting means being contained entirely within said anthropomorphic model and free of any external transmitting means physically attached thereto except said anthropomorphic model;

and data receiving and storage means within said anthropomorphic model for receiving said signal from said sensing means and storing said signal within memory means.

11. The anthropomorphic model system of claim 1 wherein said anthropomorphic model contains:

sensing means for signal transduction in response to activation of said sensing means by the generation of physical parameters including force;

data transmitting means for transmitting said signal to data receiving and storage means, said transmitting means being located at a point external to said anthropomorphic model and connected by signal transmitting means to said anthropomorphic model;

and data receiving and storage means outside said anthropomorphic model for receiving said signal from said sensing means and storing said signal within memory means.

12. The anthropomorphic model system of claim 1 wherein said anthropomorphic model contains internal means for simulating moisture losses to atmosphere which are normal for a variety of physiological states corresponding to different size and weight classes of the human body.

13. The anthropomorphic model of claim 1 wherein said model contains an internal framework means, such internal framework means having prominences at positions corresponding to at least one of: occiput, scapula; sacrum; trochanter; heel; ankle; knee; and ischium.

14. The anthropomorphic model of claim 1 wherein said anthropomorphic model contains an internal framework composed of simulated bones having a soft core encased in fiberglass reinforced plastic material.

15. The anthropomorphic model of claim 1 wherein said anthropomorphic model contains compartments at positions corresponding to at least one of: heel, ankle, knee, trochanter, sacrum, scapula, ischium or cranium; said compartments having the ability to hold blocks of live tissue of human or animal origin.

16. The anthropomorphic model system of claim 1, wherein said sensing means includes a plurality of sensors.

17. The anthropomorphic model system of claim 1, wherein said system is designed for testing the efficacy of a support structure in the prevention and treatment of decubitus or pressure ulcers and related conditions; said system including the placement of said anthropomorphic model on a support structure to be tested and wherein the signals from said sensors are indicative of the efficacy or lack thereof of said support structure.

18. The anthropomorphic model as claimed in claim 1, wherein said flexible human skin and subcutaneous tissue simulating materials comprise a single layer.

19. The anthropomorphic model as claimed in claim 1, wherein said flexible human skin and subcutaneous tissue simulating materials comprise at least two layers.

20. A method for measuring the efficacy parameters of support structures to be used in the prevention and treatment of decubitus or pressure ulcer formation comprising:

resting an anthropomorphic model simulating the major dynamic characteristics of a human and having flexible human skin and subcutaneous tissue simulating materials including a cutaneous region and a subcutaneous region;

placing sensing means at specific locations on and within said cutaneous and subcutaneous regions of said model on a support structure to be tested for efficacy, said sensing means capable of measuring physical parameters comprising at least one of temperature, moisture accumulation, pressure, shear and friction; and means for collecting and interpreting data obtained from said sensing means to determine loading at sensing locations to thereby determine likelihood of injury to a human resting on such support.

21. The method of claim 20 wherein said anthropomorphic model component is contacted with said support structure component such that signals are generated by said plurality of sensing means located within said anthropomorphic model and said signals are collected and interpreted as indicative of the efficacy, or lack thereof, of said support structure.

22. The method of claim 20 wherein said anthropomorphic model component is interchangeable such that all classes of human size and weight forms, as represented by said anthropomorphic models of differing specifications, can be included in the test procedure.

23. The method of claim 20 wherein said testing system is standardized by the manufacture of said anthropomorphic models representative of all human size and weight classes, said anthropomorphic models capable of being reproducibly manufactured to predetermined, uniform specifications.

24. The method of claim 20 wherein said anthropomorphic model contains blocks of live tissue of human or animal origin at various positions corresponding to at least one of the positions identified at risk for the development of pressure or decubitus ulcer formation.

25. The method of claim 20 wherein said anthropomorphic model containing blocks of live tissue is contacted with said support structure and assessment of the viability of said block of live tissue is indicative of the efficacy, or lack thereof, of said support structure.

26. The method claim 20 wherein said testing system is used to obtain quantitative measurements of physical parameters including, but not limited to, at least one of temperature, moisture accumulation, contact pressure, shear and/or friction in research procedures aimed at studying the etiology of, or methods for treatment and/or prevention of decubitus or pressure ulcer formation.

27. An anthropomorphic model simulating the major dynamic characteristics of a human, said anthropomorphic model being adaptably representative of specific classes of human body form as regards body build and including flexible human skin simulating materials including a cutaneous region and a subcutaneous region covering at least parts of the model;

sensing means located within the flexible human skin simulating materials of said anthropomorphic model for measuring physical parameters such as pressure, shear and friction forces acting on said anthropomorphic model; and means for detecting signals from said sensing means for ascertaining at least one of the pressure, shear and friction forces existing within the flexible skin simulating materials.

28. An anthropomorphic model as claimed in claim 27, wherein the sensing means located within the flexible human skin simulating materials is located within the subcutaneous region and wherein said means for detecting signals determine the pressure, shear and friction forces existing within the subcutaneous region.

29. An anthropomorphic model as claimed in claim 27, wherein said sensing means includes sensors located at a number of predetermined positions on, and in the vicinity of, the surface of the flexible human skin and within the subcutaneous region located within the interior of said anthropomorphic model; said sensors for sensing at least one of the pressure, shear and friction forces existing at the surface of the skin and within the subcutaneous tissue.

30. An anthropomorphic model as claimed in claim 29, wherein said sensors are disposed on, and within the subcutaneous tissue of the model for measuring pressure, shear and friction forces acting on said anthropomorphic model when arranged in life-like positions resting on a support structure; and wherein said means for detecting signals from said sensing means are indicative of the efficacy, or lack thereof, of said support structure.

31. The anthropomorphic model as claimed in claim 29, wherein said means for detecting signals also includes means for displaying the signals.

32. The anthropomorphic model as claimed in claim 31, wherein said sensing means for measuring pressure includes means for measuring contact pressure between the surface of the skin and any underlying support structure and internal pressure within the flexible human skin simulating materials.

33. The anthropomorphic model as claimed in claim 27, wherein said cutaneous and subcutaneous regions of said flexible human skin simulating materials comprise a single layer.

34. The anthropomorphic model as claimed in claim 27, wherein said cutaneous and subcutaneous regions of said flexible human skin simulating materials comprise at least two layers.

35. A method for measuring the external and internal pressures and forces sensed by parts of an anthropomorphic model simulating the major dynamic characteristics of a human, said anthropomorphic model including flexible human skin simulating materials with a cutaneous region and a subcutaneous region comprising:

placing sensing means at specific locations on, and within, said flexible human skin of said model; said sensing means capable of measuring physical parameters comprising at least one of temperature, moisture accumulation, pressure, shear and friction;

resting said anthropomorphic model on a support structure; and sensing and interpreting data obtained from said sensing means to determine at least one of temperature, moisture accumulation, pressure, shear and friction at a sensing location on, and within, said flexible human skin.

36. A method as claimed in claim 35 wherein the placing of sensing means at specific locations includes the placing of a sensing means within the subcutaneous region of said flexible human skin for sensing at least one of temperature, moisture accumulation, pressure, shear and friction present within the subcutaneous region.

* * * * *